United States Patent
Rosa et al.

(10) Patent No.: US 12,517,805 B2
(45) Date of Patent: Jan. 6, 2026

(54) AUTOMATIC IDENTIFICATION OF LOGGING INCONSISTENCIES IN SOURCE CODE

(71) Applicant: SAP SE, Walldorf (DE)

(72) Inventors: Marco Rosa, Biot (FR); Merve Sahin, Antibes (FR)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 18/529,909

(22) Filed: Dec. 5, 2023

(65) Prior Publication Data

US 2025/0181480 A1 Jun. 5, 2025

(51) Int. Cl.
*G06F 11/3604* (2025.01)
*G06F 18/2415* (2023.01)

(52) U.S. Cl.
CPC ...... *G06F 11/3608* (2013.01); *G06F 18/2415* (2023.01)

(58) Field of Classification Search
None
See application file for complete search history.

(56) References Cited

U.S. PATENT DOCUMENTS

| | | | | |
|---|---|---|---|---|
| 2012/0060142 A1* | 3/2012 | Fliess | ................. | G06F 11/3457 717/102 |
| 2016/0124823 A1* | 5/2016 | Ruan | .................... | G06F 11/079 714/26 |
| 2021/0132915 A1* | 5/2021 | Ivankovic | .............. | G06N 20/00 |
| 2022/0188220 A1* | 6/2022 | Shailendra | .......... | G06F 11/3688 |
| 2022/0405091 A1* | 12/2022 | Mahanta | .................. | G06N 3/10 |
| 2024/0045955 A1* | 2/2024 | Sahin | .................... | G06F 21/552 |
| 2024/0330375 A1* | 10/2024 | Iakimova | ................ | G06F 16/93 |

OTHER PUBLICATIONS

Alomari, Firas, "Scalable Source Code Similarity Detection in Large Code Repositories", arXiv preprint arXiv:1907.11817, (2019), 11 pgs.

Candido, J., "An Exploratory Study of Log Placement Recommendation in an Enterprise System", IEEE ACM 18th International Conference on Mining Software Repositories (MSR), Madrid, Spain, (2021), 143-154.

(Continued)

*Primary Examiner* — Qing Chen
(74) *Attorney, Agent, or Firm* — SCHWEGMAN LUNDBERG & WOESSNER, P.A.

(57) ABSTRACT

In an example embodiment, various types of logging inconsistencies contained in a source code repository are automatically detected and reported to the developers responsible for the maintenance of the software products. First, logging statements in the source code are identified, such as by using static code analysis tools (with some help if custom logging libraries or logging classes are used). For each logging statement, the function (e.g., the method) and/or the block of code in which the log resides is identified. Second, logging statements and their methods are analyzed pairwise in order to find the logging statements and the functions (or code blocks) that are similar to each other. In an example embodiment, this analysis is performed by a machine learning model, as will be described in more detail later.

20 Claims, 4 Drawing Sheets

(56) References Cited

OTHER PUBLICATIONS

Gao, Tianyu, "SimCSE: Simple Contrastive Learning of Sentence Embeddings", Empirical Methods in Natural Language Processing (EMNLP), (2021), 17 pgs.

Gholamian, Sina, "A Comprehensive Survey of Logging in Software: From Logging Statements Automation to Log Mining and Analysis", (Jun. 2022), 45 pgs.

Jatnika, Derry, "Word2Vec Model Analysis for Semantic Similarities in English Words", Procedia Computer Science, vol. 157, (2019), 160-167.

Jieming, Zhu, "Learning to Log: Helping Developers Make Informed Logging Decisions", In 2015 IEEE ACM 37th IEEE International Conference on Software Engineering, vol. 1, (2015), 415-425.

Li, H., "Which log level should developers choose for a new logging statement?", IEEE 25th International Conference on Software Analysis, Evolution and Reengineering (SANER), Campobasso, Italy, (journal-first abstract), (2018), 468-468.

Li, Z., "Studying Duplicate Logging Statements and Their Relationships with Code Clones", In IEEE Transactions on Software Engineering, vol. 48, No. 7, (Jul. 1, 2022), 2476-2494.

Liu, Z, "Which Variables Should I Log?", In IEEE Transactions on Software Engineering, vol. 47, No. 9, (Sep. 1, 2021), 2012-2031.

Reimers, Nils, "Sentence-BERT: Sentence Embeddings using Siamese BERT-Networks", In Proceedings of the 2019 Conference on Empirical Methods in Natural Language Processing and the 9th International Joint Conference on Natural Language Processing, (2019), 3982-3992.

Shen, Bingyu, "Improving logging to reduce permission overgranting mistakes", In 32nd USENIX Security Symposium (USENIX Security 23). USENIX Association, (Aug. 2023), 19 pgs.

Yasemin, Acar, "You are Not Your Developer, Either: A Research Agenda for Usable Security and Privacy Research Beyond End Users", In 2016 IEEE Cybersecurity Development (SecDev), (2016), 3-8.

Yuan, Ding, "Characterizing Logging Practices in Open-Source Software", In 2012 34th International Conference on Software Engineering (ICSE), (2012), 102-112.

Zhang, Cheng, "AutoLog: Facing Log Redundancy and Insufficiency", In Proceedings of the Second Asia-Pacific Workshop on Systems, APSys '11, Association for Computing Machinery, (2011), 5 pgs.

\* cited by examiner

AUTOMATIC IDENTIFICATION OF LOGGING INCONSISTENCIES IN SOURCE CODE

TECHNICAL FIELD

This document generally relates to computer software application development. More specifically, this document relates to the automatic identification of logging inconsistencies in source code.

BACKGROUND

Computer software may be written using an integrated development environment (IDE), which is a software application that provides developers with a comprehensive set of tools for writing, testing, and debugging code. An IDE typically includes a code editor, a compiler or interpreter, a debugger, and other tools that help developers automate common tasks and streamline their workflow.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
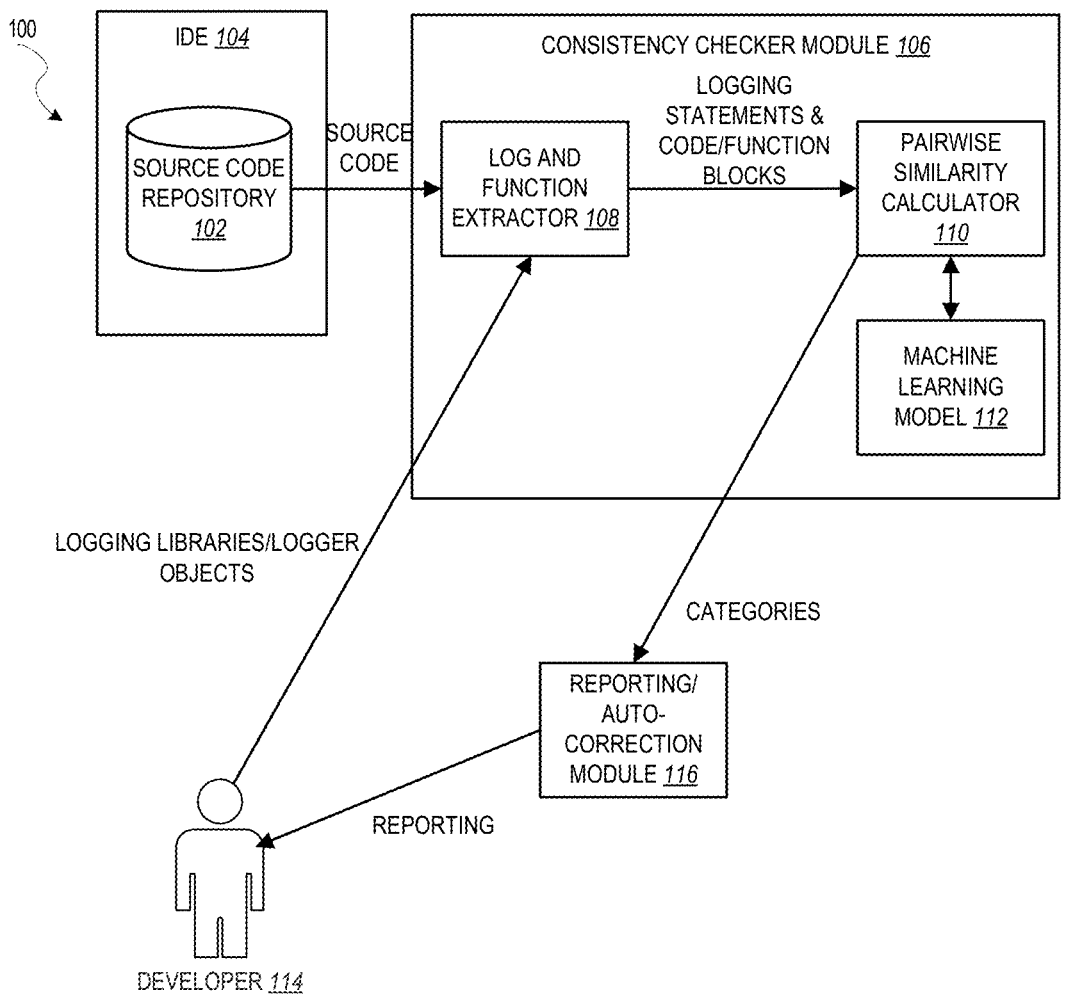
FIG. 1 is a block diagram illustrating a system for automatically detecting logging inconsistencies in source code, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Logging is a crucial part of software development. It allows programmers and other users to gain visibility into an application's runtime, and detect suspicious and malicious behavior. For instance, various security guidelines mandate that software products log certain security-related events for forensics purposes. However, the lack of sufficient and proper logging practices has been common in the software industry. Insufficient logging and monitoring is a security risk.

There are a number of reasons why logging inconsistencies occur. Developers are often concerned more with functionality, performance, and time-to-market than logging. In addition, developers might be responsible for a small part of the software and might lack a holistic view, which makes it difficult to know what it is important to log. Similarly, when the logging guidelines are not clear, developers might make personal decisions on how and what to log.

All these reasons may lead to various logging inconsistencies within an application, such as the same type of event logged with different log verbosity level (e.g., debug, error, warning, etc.), reused (e.g., copy and pasted) pieces of code with logging statements not matching the current context, and logging statements unnecessarily repeated.

In an example embodiment, various types of logging inconsistencies contained in a source code repository are automatically detected and reported to the developers responsible for the maintenance of the software products. First, logging statements in the source code are identified, such as by using static code analysis tools (with some help if custom logging libraries or logging classes are used). For each logging statement, the function (e.g., the method) and/or the block of code in which the log resides is identified.

Second, logging statements and their methods are analyzed pairwise in order to find the logging statements and the functions (or code blocks) that are similar to each other. In an example embodiment, this analysis is performed by a machine learning model, as will be described in more detail later.

Four different cases can be identified depending on the similarity or non-similarity between each pair of logging statements. Specifically, what is being examined is the similarity of the log messages themselves and the similarity of the functions or blocks of code corresponding to the log messages. The first case is similar functions/code blocks and similar log message. In this case it is unlikely to have an inconsistency, although on rare occasions there may be an inconsistency in the log level (e.g., the same log message is logged at a "warning" level in one function and an "info" level in another). The second case is similar functions/code blocks with non-similar log messages. Possible inconsistencies here can be in the log message itself: (e.g., cut and pasted code, typos, etc.), or in the logged variables. The third case is similar log messages in non-similar functions/code blocks. Here, the log message may be too generic (e.g., the same message for every exception raised). The fourth case is non-similar logs in non-similar functions/code blocks. Here, no inconsistencies are identified because the logging statements in the pair were designed to be different.

The potential inconsistencies detected, based on the category the pair is classified as, can then be relayed to the developer responsible for the source code. It is also possible to auto-correct certain consistencies, such as by choosing the least verbose and highest criticality log level, or to make code suggestions for potential corrections.

FIG. 1 is a block diagram illustrating a system 100 for automatically detecting logging inconsistencies in source code, in accordance with an example embodiment. An IDE 104 maintains a source code repository 102. The IDE 104 may be public or private, and can be on-premise or in the cloud. Furthermore, in some instances, the IDE 104 may be installed locally on a developer machine, rather than on a platform (or, at least, the source code being examined is on the developer machine, rather than the platform).

A consistency checker module 106 contains a log and function extractor 108, which extracts log statements and functions/blocks of codes corresponding to the logging statements in source code in the source code repository 102. This may be performed using a technique such as Abstract Syntax Trees or regular expressions.

An Abstract Syntax Tree is a fundamental data structure used in programming language processing to represent the hierarchical structure of source code in an abstract and language-independent manner. It is a hierarchical data structure used to represent the abstract syntactic structure of source code written in a programming language.

Regular expressions provide a way to describe and search for patterns within text. These patterns can range from simple to complex. Regular expressions use special characters with unique meanings. For example, the dot (•) matches any character, the asterisk (*) matches zero or more of the preceding character, and the pipe (|) functions as an OR operator. Character classes in regular expressions allow a developer to define sets of characters to match. For instance, [0-9] matches any digit. Quantifiers in regular expressions specify how many times a character or group should appear. For example, a{2,4} matches between 2 and 4 consecutive "a" characters. Anchors are used to specify where a match should start or end. The caret (^) anchors at the beginning of a line, while the dollar sign ($) anchors at the end. Regular expressions support grouping with parentheses, which can be used for capturing and extracting parts of matched text. Escape sequences allow the developer to match special characters as regular characters by using a backslash ( ). Regular expressions can be "greedy" by default, meaning they match as much text as possible.

A pairwise similarity calculator 110 then utilizes the extracted logs and functions to determine pairwise similarity between logging statements in the source code in the source code repository 102. The pairwise similarity calculator 110 may utilize a machine learning model 112 as part of its calculation process. This machine learning model 112 will be described in more detail below. The pairwise similarity may be calculated by first computing similarity scores between logging statements themselves and second computing similarity scores between corresponding functions or blocks of code, and then classifying the pairwise similarity based on those two types of similarity scores.

In some instances, input from a developer 114, such as logging libraries or logger objects, may additionally be used for extraction of the logs and functions by the log and function extractor 108.

A reporting/auto-correction module 116 then may either report any inconsistencies found to the developer 114, or may automatically correct the inconsistencies, or some combination thereof. Several different reporting methods may be utilized, such as emails or tickets. Various different auto-correction techniques can be utilized, such as heuristics or natural language processing (NLP) models.

The machine learning model 112 may be trained using a machine learning algorithm. The data acquisition model may be trained using a first machine learning algorithm. In an example embodiment, the first machine learning algorithm may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

The machine learning algorithm may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In one example embodiment, the machine learning model 112 includes a Bidirectional Encoder Representations from Transformers (BERT) model, to encode text portions into embeddings. BERT is a type of natural language processing (NLP) model based on the transformer architecture. BERT uses one or more transformer layer(s) within a neural network to encode the input sentence to an embedding. Each transformer layer is defined as follows:

$$TFLayer(h^{n-1}) = FC(MultiAttn(h^{n-1}));$$

$$FC(x) = relu(xW_1 + b_1)W_2 + b_2;$$

$$MultiAttn(h^{n-1}) = concat(head_1(h^{n-1}), \ldots, head_k(h^{n-1}))W^O,$$

$$head_i(h^{n-1}) = softmax\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer.

In another example embodiment, the machine learning model 112 is a Word2Vec model. Word2Vec uses an embedder, which is a shallow, two-layer neural network trained to reconstruct linguistic contexts of words. Word2Vec takes as input a large corpus of text and produces a vector space, typically of several hundred dimensions, with each unique word in the corpus being assigned a corresponding vector in the space. Word vectors are positioned in the vector space such that words that share common contexts in the corpus are in close proximity to one another in the space.

In another example embodiment, a sentence similarity transformer model may be used in the machine learning model 112. A sentence similarity transformer model is a type of natural language processing (NLP) model designed to measure the similarity between two sentences or pieces of text. It leverages transformer architecture, which has been highly successful in various NLP tasks. Transformer models are known for their ability to capture contextual information effectively and have been the foundation for many state-of-the-art NLP applications.

The goal of a sentence similarity transformer model is to determine how similar or related two sentences are, often by providing a similarity score or metric.

In another example embodiment, a large language model may be used as part of the machine learning model 112. Here, a large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

Figure 2:
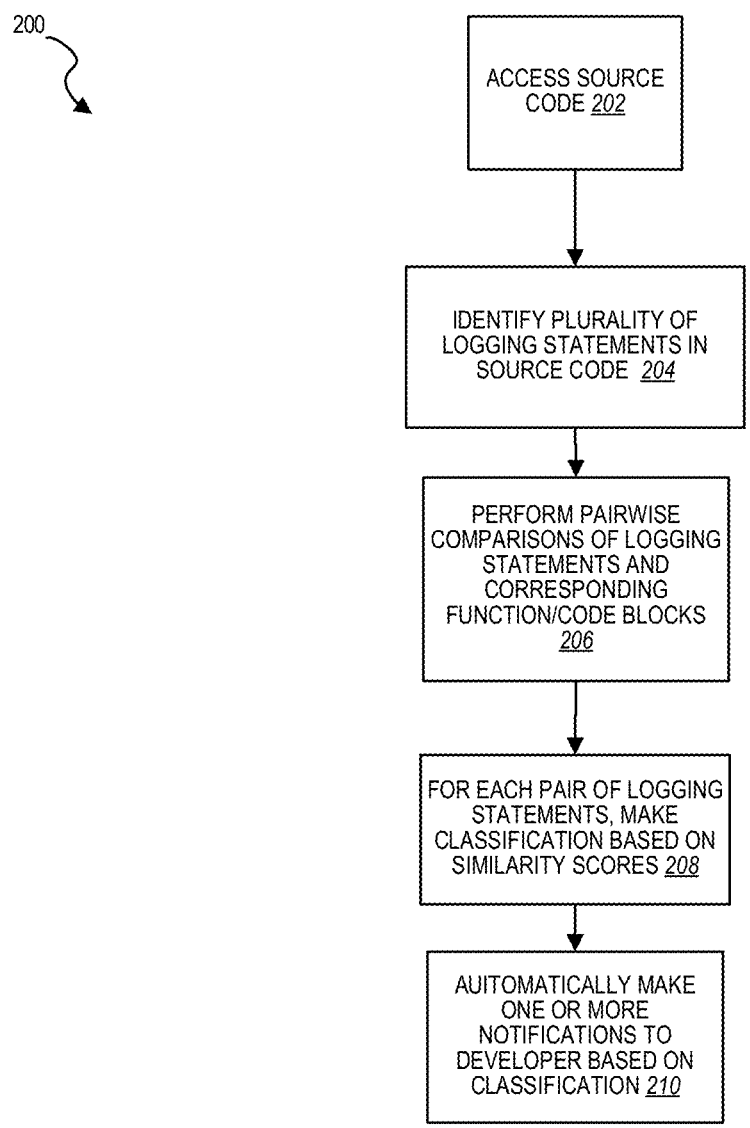
FIG. 2 is a block diagram illustrating a system for automatically detecting logging inconsistencies in source code, in accordance with an example embodiment.

FIG. 2 is a flow diagram illustrating a method 200 for automatically detecting logging inconsistencies, in accordance with an example embodiment. At operation 202, source code is accessed. This source code may be stored, for example, in a source code repository of an IDE. At operation 204, a plurality of logging statements in the source code may be identified. This may include using an Abstract Syntax Tree parser or a regular expression parser. A logging statement usually presents in the following format:

<logger_object>.<log_level>(<log_description>)

Both the log level and the description are taken into consideration for the method 200. In addition, the functions or the code blocks where the logs appear can be identified using an Abstract Syntax Tree (or Call Flow Graph (CFG) or Code Property Graph (CPG)) to parse the source code. A CFG refers to a representation of the flow of function or method calls within a software program. It provides an overview of how different functions or methods are invoked and interconnected, helping developers understand the program's structure and how control flows through various parts of the code.

A CPG is a data structure and graph representation of the source code of a software program. It is designed to capture various aspects of the code, its structure, and its relationships in a way that facilitates program analysis, code understanding, and software engineering tasks. In this graph:

Nodes represent different elements of the code, like functions, classes, variables, and statements.

Relationships between these elements are depicted as edges in the graph, showing how they interact or depend on each other.

This representation captures the program's structure, control flow, data flow, and additional information about the code elements, like their data types or values.

CPGs can be used to analyze and understand complex codebases, helping developers and tools to identify issues, assess code quality, and detect vulnerabilities, among other tasks.

CPGs are versatile and can be applied to code written in different programming languages, making them language-agnostic.

At operation 206, a pairwise comparison of the log statements in the source code is performed, together with a pairwise comparison of corresponding code blocks. For logging statements, as described earlier, a machine learning model such as BERT or Word2Vec may be used to determine similarity scores for each pair of logging statements. For comparison of pairs of code blocks/functions, source code similarity detection techniques can be used, or Word2Vec. The similarity score is a score reflective of the similarity between two things. In some instances, it may be represented as a percentage or at least a value proportional to a percentage, such as a value between 0 and 100 with 100 being completely similar (identical) and 0 being completely dissimilar.

At operation 208, for each pair of logging statements, a classification is made based on the similarity score for the log statements themselves as well as the similarity score for the corresponding code blocks. This classification assigns each pair to one of the four categories described earlier. Each category has its own list of possible logging inconsistencies.

At operation 210, based on the category each log statement pair is assigned into, one or more notifications or recommendations are automatically made to the developer managing the source code. In categories where there are no inconsistencies found (e.g., every pair is classified into groups 1 or 4), then it is possible that a notification or recommendation will not be made to the developer, although in some instances a notification that "no inconsistencies are found" or the like may be supplied.

The following are examples to clarify the process. Consider a scenario where XYZ is an open source project, maintained by developer ALICE. Together with ALICE there are other developers contributing to XYZ.

The following login function was originally developed by ALICE. There are then several use cases showing contributions from developer BOB that may (or may not) introduce logging inconsistencies. The following is ALICE's login function:

```
def login(username, password):
    if is_valid_login(username, password):
        logging.info(f"User '{username}' logged in successfully.")
        return True
    else:
        logging.warning(f"Failed login attempt for user '{username}'.")
        return False
```

In a first example, the login function is presented without any inconsistency introduced by the function admin_login developed by BOB:

```
def admin_login(master_password):
    if is_valid_login("admin", master_password):
        logging.info("User admin logged in successfully.")
        return True
    else:
        logging.warning("Failed login attempt for user admin.")
        return False
```

Indeed, the two functions (login and admin_login) present a very similar structure and content, as well as very similar messages (and same levels) in the logging statements. In this case, there would be no notification to the developers as no inconsistency would be detected.

In a second example, the login function is presented with an inconsistency:

```
def admin_login(master_password):
    if is_valid_login("admin", master_password):
        logging.debug("User admin logged in successfully.")
        return True
    else:
        logging.error("Failed login attempt for user admin.")
        return False
```

In this example, the functions admin and admin_login present similar structure and content. Also, the two log statements contain very similar messages, but their level is inconsistent with the ones from the original function login (info vs debug the former, warning vs error the latter). In this case, the inconsistent log levels would be notified to the developers. Both the first use case and the second use case may have been classified by the machine learning model as being in case (1), namely similar logging statements and similar code blocks.

In a third example, case (2) is examined, meaning similar functions but dissimilar logging statements:

```
def admin_login(master_password):
    if is_valid_login("admin", master_password):
        logging.info("User admin logged in successfully.")
        return True
    else:
        logging.error("Error occurred at data processing.")
        return False
```

As can be seen, the functions have similar structure, whereas the second log statement contains an inconsistency. Indeed, the message is completely different from the one in the original login function, suggesting it could be an incorrect copy-paste.

In this case, the inconsistent message would be notified to the developers.

In a fourth example, case (3) is examined, meaning similar logging statements and dissimilar code blocks:

```
def authorize_user (resource, username):
    check_something( )
    if is_authenticated_user(username):
        logging.info(f"User '{username}' logged in successfully.")
        return check_authorization(resource, username)
    else:
        return False
```

As can be seen, function authorize_user has no relation to the original login function, but it contains a similar logging statement (when the developer checks if a user is already authenticated, before the authorization attempt).

In this case, the logging statement should say that the "user is already authenticated" instead of saying that it is a new login event.

This may suggest that BOB copy-pasted the code from login and forgot to update the log statements, introducing such inconsistency that would need to be notified to the developer.

In a fifth example, case (4) is examined, meaning dissimilar logging statements and dissimilar code blocks:

```
def foo(** kwargs):
    do something( )
    logging.info("Action completed")
    ...
    logging.info("Return to main function")
    return True
```

As can be seen, the function is completely different from the original login function, and also the log statements share no similarity among them. In such case there is no basis to say whether the logs/functions contain inconsistencies or not.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing source code of a software application; extracting a plurality of logging statements from the source code, each logging statement being contained within a code block; for each pair of extracted logging statements; using a first machine learning model to calculate a first similarity score, the first similarity score reflective of a similarity between the extracted logging statements in a corresponding pair; calculating a second similarity score, the second similarity score reflective of a similarity between the code blocks in which the extracted logging statements in the corresponding pair are contained; classifying the pair into a category reflective of a likelihood that there are inconsistencies between the extracted logging statements in the corresponding pair; and notifying a developer of the software application of an inconsistency in logging statements in the source code based on the classified category.

In Example 2, the subject matter of Example 1 includes, wherein the source code is contained in a source code repository in an Integrated Development Environment (IDE).

In Example 3, the subject matter of Examples 1-2 includes, wherein the first machine learning model is a Bidirectional Encoder Representations from Transformers (BERT) model.

In Example 4, the subject matter of Examples 1-3 includes, wherein the first machine learning model is a Word2Vec model.

In Example 5, the subject matter of Examples 1-4 includes, wherein the calculating the first similarity score uses a second machine learning model.

In Example 6, the subject matter of Examples 1-5 includes, wherein the extracting includes using Abstract Syntax Tree representation of the source code.

In Example 7, the subject matter of Examples 1-6 includes, wherein the extracting includes using a regular expression representation of the source code.

Example 8 is a method comprising: accessing source code of a software application; extracting a plurality of logging statements from the source code, each logging statement being contained within a code block; for each pair of extracted logging statements; using a first machine learning model to calculate a first similarity score, the first similarity score reflective of a similarity between the extracted logging statements in a corresponding pair; calculating a second similarity score, the second similarity score reflective of a similarity between the code blocks in which the extracted logging statements in the corresponding pair are contained; classifying the pair into a category reflective of a likelihood that there are inconsistencies between the extracted logging statements in the corresponding pair; and notifying a developer of the software application of an inconsistency in logging statements in the source code based on the classified category.

In Example 9, the subject matter of Example 8 includes, wherein the source code is contained in a source code repository in an Integrated Development Environment (IDE).

In Example 10, the subject matter of Examples 8-9 includes, wherein the first machine learning model is a Bidirectional Encoder Representations from Transformers (BERT) model.

In Example 11, the subject matter of Examples 8-10 includes, wherein the first machine learning model is a Word2Vec model.

In Example 12, the subject matter of Examples 8-11 includes, wherein the calculating the first similarity score uses a second machine learning model.

In Example 13, the subject matter of Examples 8-12 includes, wherein the extracting includes using Abstract Syntax Tree representation of the source code.

In Example 14, the subject matter of Examples 8-13 includes, wherein the extracting includes using a regular expression representation of the source code.

Example 15 is a non-transitory machine-readable medium storing instructions which, when executed by one or more processors, cause the one or more processors to perform operations comprising: accessing source code of a software application; extracting a plurality of logging statements from the source code, each logging statement being contained within a code block; for each pair of extracted logging statements; using a first machine learning model to calculate a first similarity score, the first similarity score reflective of a similarity between the extracted logging statements in a corresponding pair; calculating a second similarity score, the second similarity score reflective of a similarity between the code blocks in which the extracted logging statements in the corresponding pair are contained; classifying the pair into a category reflective of a likelihood that there are inconsistencies between the extracted logging statements in the corresponding pair; and notifying a developer of the software application of an inconsistency in logging statements in the source code based on the classified category.

In Example 16, the subject matter of Example 15 includes, wherein the source code is contained in a source code repository in an Integrated Development Environment (IDE).

In Example 17, the subject matter of Examples 15-16 includes, wherein the first machine learning model is a Bidirectional Encoder Representations from Transformers (BERT) model.

In Example 18, the subject matter of Examples 15-17 includes, wherein the first machine learning model is a Word2Vec model.

In Example 19, the subject matter of Examples 15-18 includes, wherein the calculating the first similarity score uses a second machine learning model.

In Example 20, the subject matter of Examples 15-19 includes, wherein the extracting includes using Abstract Syntax Tree representation of the source code.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
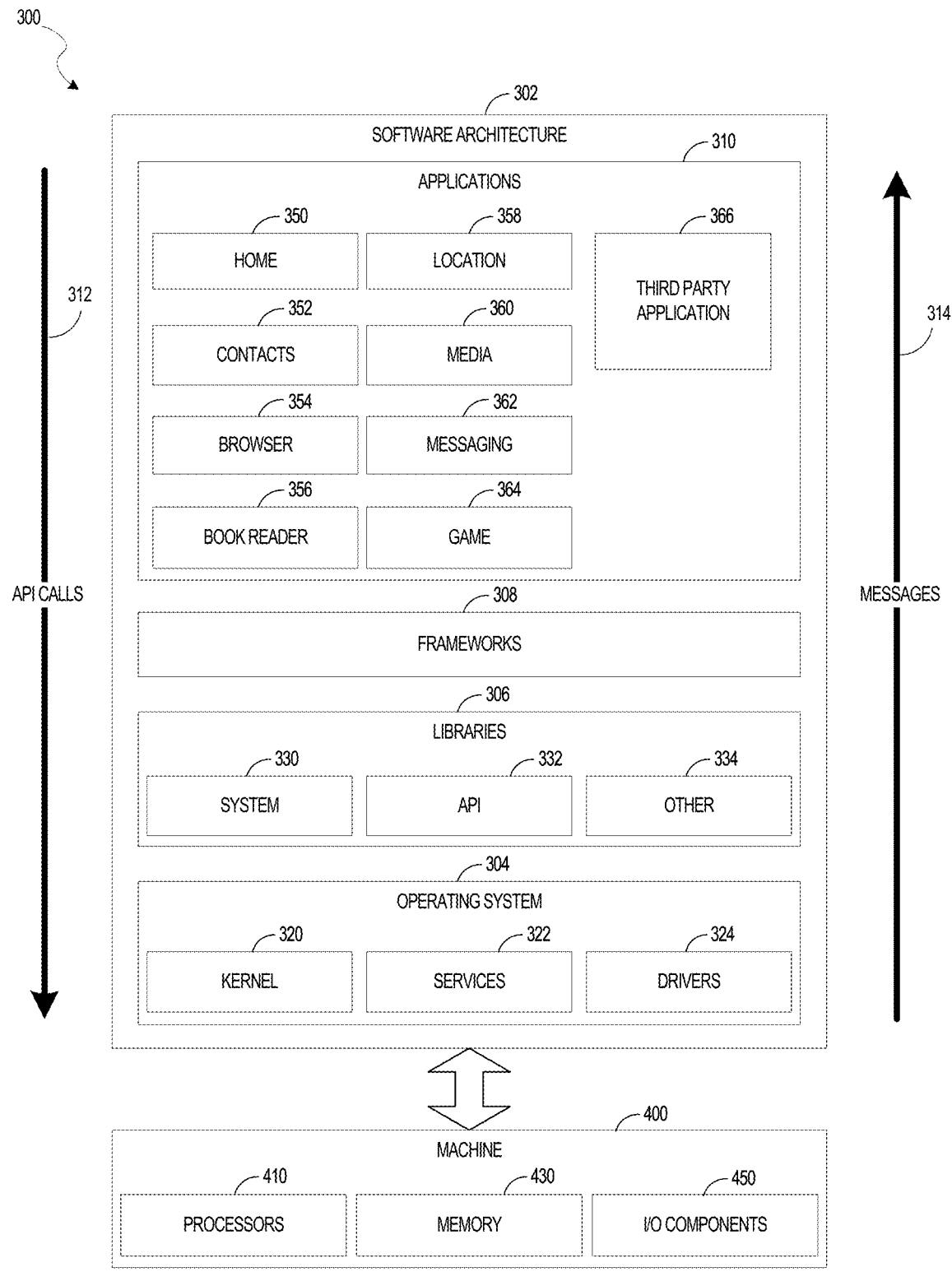
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various graphical user interface (GUI) functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
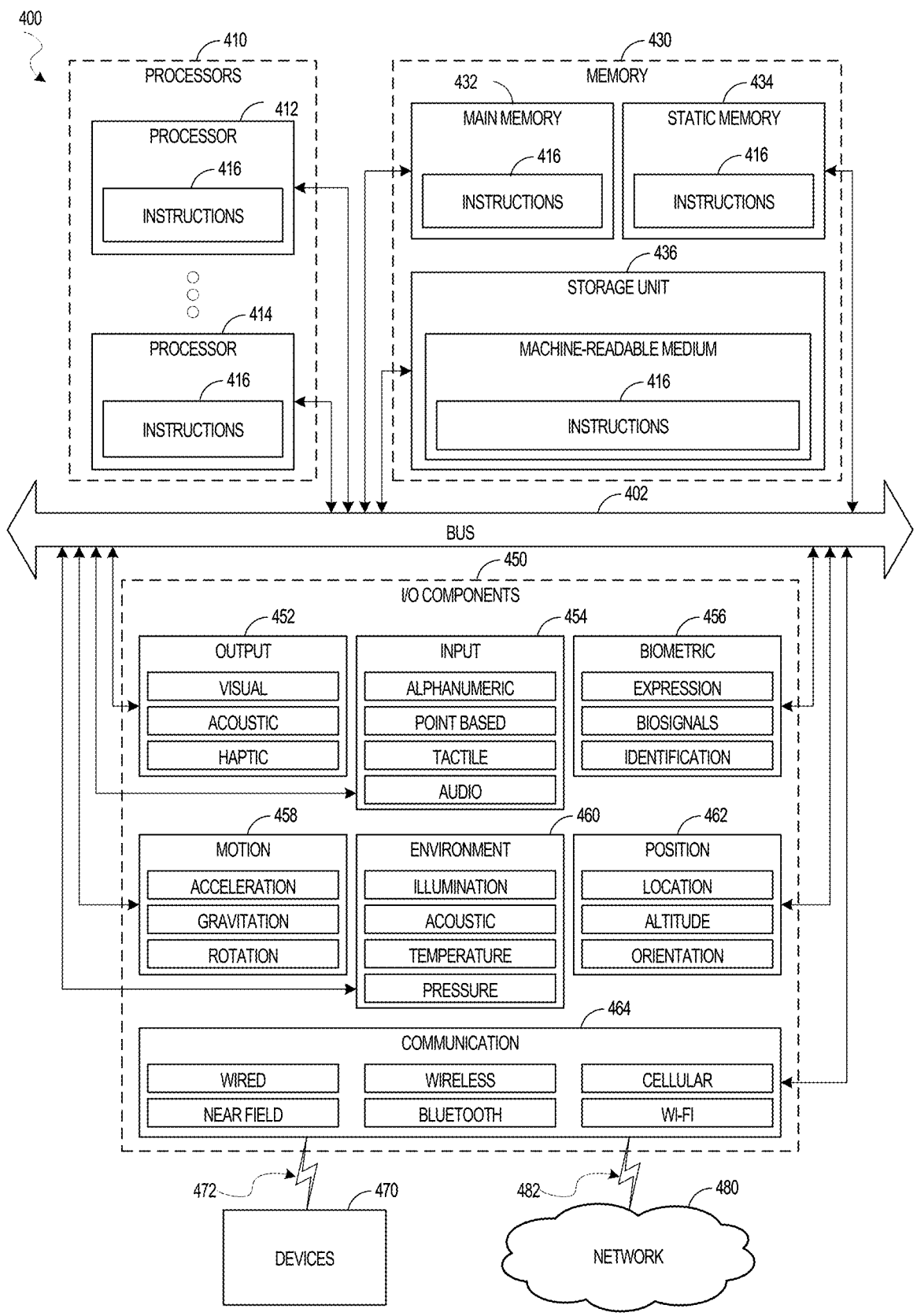
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method of FIG. 2. Additionally, or alternatively, the instructions 416 may implement FIGS. 1-3 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., Hypertext Transfer Protocol [HTTP]). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   accessing source code of a software application;
   extracting a plurality of logging statements from the source code of the software application, wherein each logging statement of the plurality of logging statements is contained within a code block; and
   for each pair of extracted plurality of logging statements:
   using a first machine learning model to calculate a first similarity score, wherein the first similarity score is reflective of a similarity between the extracted plurality of logging statements in a corresponding pair;
   using the first machine learning model to calculate a second similarity score, wherein the second similarity score is reflective of a similarity between code blocks in which the extracted plurality of logging statements in the corresponding pair are contained;

classifying the corresponding pair into a category reflective of a likelihood that there are inconsistencies between the extracted plurality of logging statements in the corresponding pair;

automatically notifying a developer of the software application of an inconsistency in the plurality of logging statements in the source code of the software application based on the classified category; and in response to the automatically notifying, correcting, via an Integrated Development Environment (IDE), the inconsistency in the plurality of logging statements in the source code of the software application based on the classified category.

2. The system of claim 1, wherein the source code of the software application is contained in a source code repository in the IDE.

3. The system of claim 1, wherein the first machine learning model is a Bidirectional Encoder Representations from Transformers (BERT) model.

4. The system of claim 1, wherein the first machine learning model is a Word2Vec model.

5. The system of claim 1, wherein the calculating the first similarity score uses a second machine learning model.

6. The system of claim 1, wherein the extracting includes using Abstract Syntax Tree representation of the source code of the software application.

7. The system of claim 1, wherein the extracting includes using a regular expression representation of the source code of the software application.

8. A method comprising:

accessing source code of a software application;

extracting a plurality of logging statements from the source code of the software application, wherein each logging statement of the plurality of logging statements is contained within a code block; and for each pair of extracted plurality of logging statements:
  using a first machine learning model to calculate a first similarity score, wherein the first similarity score is reflective of a similarity between the extracted plurality of logging statements in a corresponding pair;
  using the first machine learning model to calculate a second similarity score, wherein the second similarity score is reflective of a similarity between code blocks in which the extracted plurality of logging statements in the corresponding pair are contained;
  classifying the corresponding pair into a category reflective of a likelihood that there are inconsistencies between the extracted plurality of logging statements in the corresponding pair;
  automatically notifying a developer of the software application of an inconsistency in the plurality of logging statements in the source code of the software application based on the classified category; and
  in response to the automatically notifying, correcting, via an Integrated Development Environment (IDE), the inconsistency in the plurality of logging statements in the source code of the software application based on the classified category.

9. The method of claim 8, wherein the source code of the software application is contained in a source code repository in the IDE.

10. The method of claim 8, wherein the first machine learning model is a Bidirectional Encoder Representations from Transformers (BERT) model.

11. The method of claim 8, wherein the first machine learning model is a Word2Vec model.

12. The method of claim 8, wherein the calculating the first similarity score uses a second machine learning model.

13. The method of claim 8, wherein the extracting includes using Abstract Syntax Tree representation of the source code of the software application.

14. The method of claim 8, wherein the extracting includes using a regular expression representation of the source code of the software application.

15. A non-transitory machine-readable medium storing instructions which, when executed by one or more processors, cause the one or more processors to perform operations comprising:

accessing source code of a software application;

extracting a plurality of logging statements from the source code of the software application, wherein each logging statement of the plurality of logging statements is contained within a code block; and for each pair of extracted plurality of logging statements:
  using a first machine learning model to calculate a first similarity score, wherein the first similarity score is reflective of a similarity between the extracted plurality of logging statements in a corresponding pair;
  using the first machine learning model to calculate a second similarity score, wherein the second similarity score is reflective of a similarity between code blocks in which the extracted plurality of logging statements in the corresponding pair are contained;
  classifying the corresponding pair into a category reflective of a likelihood that there are inconsistencies between the extracted plurality of logging statements in the corresponding pair;
  automatically notifying a developer of the software application of an inconsistency in the plurality of logging statements in the source code of the software application based on the classified category; and
  in response to the automatically notifying, correcting, via an Integrated Development Environment (IDE), the inconsistency in the plurality of logging statements in the source code of the software application based on the classified category.

16. The non-transitory machine-readable medium of claim 15, wherein the source code of the software application is contained in a source code repository in the IDE.

17. The non-transitory machine-readable medium of claim 15, wherein the first machine learning model is a Bidirectional Encoder Representations from Transformers (BERT) model.

18. The non-transitory machine-readable medium of claim 15, wherein the first machine learning model is a Word2Vec model.

19. The non-transitory machine-readable medium of claim 15, wherein the calculating the first similarity score uses a second machine learning model.

20. The non-transitory machine-readable medium of claim 15, wherein the extracting includes using Abstract Syntax Tree representation of the source code of the software application.

* * * * *